No. 879,557. PATENTED FEB. 18, 1908.
J. W. LEDOUX.
AUTOMATIC FLOW CONTROLLER.
APPLICATION FILED JULY 11, 1907.

2 SHEETS—SHEET 1.

WITNESSES:

INVENTOR

ATTORNEY.

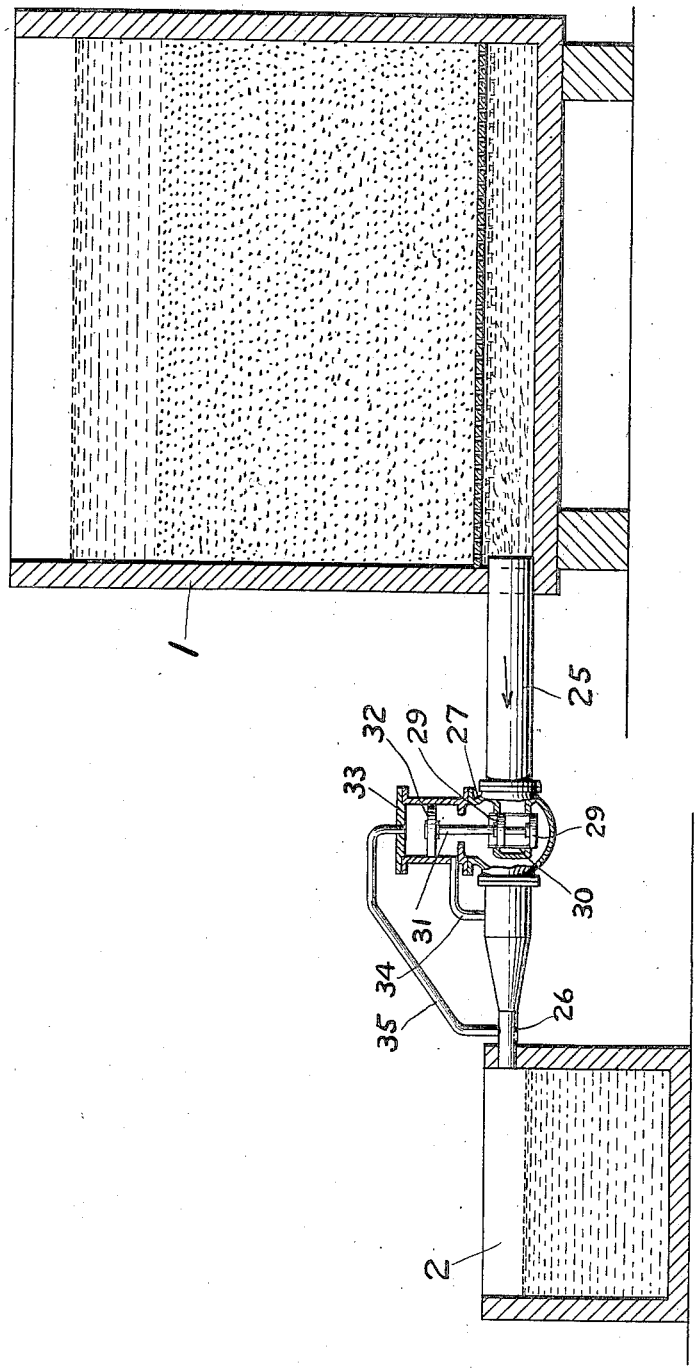

UNITED STATES PATENT OFFICE.

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

AUTOMATIC FLOW-CONTROLLER.

No. 879,557.      Specification of Letters Patent.      Patented Feb. 18, 1908.

Application filed July 11, 1907. Serial No. 383,188.

*To all whom it may concern:*

Be it known that I, JOHN W. LEDOUX, a citizen of the United States, residing at Swarthmore, in the county of Delaware and State of Pennsylvania, have invented certain Improvements in Automatic Flow-Controllers, of which the following is a specification.

This invention relates to mechanism for controlling the flow of liquids subject to variable heads and its leading purpose is to regulate to a substantially uniform rate the discharge through a conduit from a filter with variations in head between certain limits, but it is equally adapted for regulating generally the rates of flow induced by heads or pressures which vary.

Figure 1:
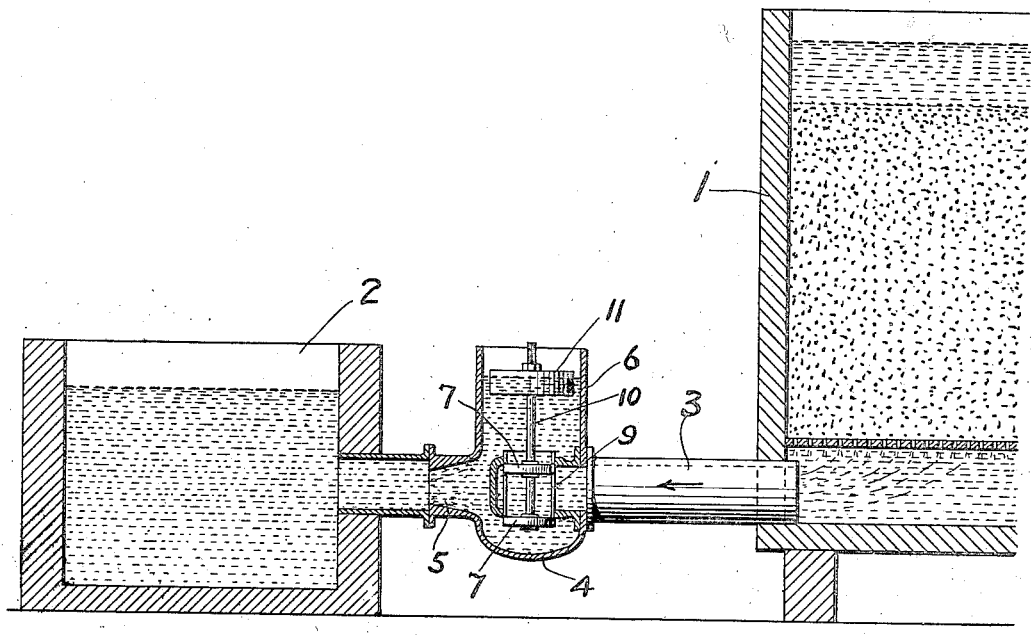
Figure 2:
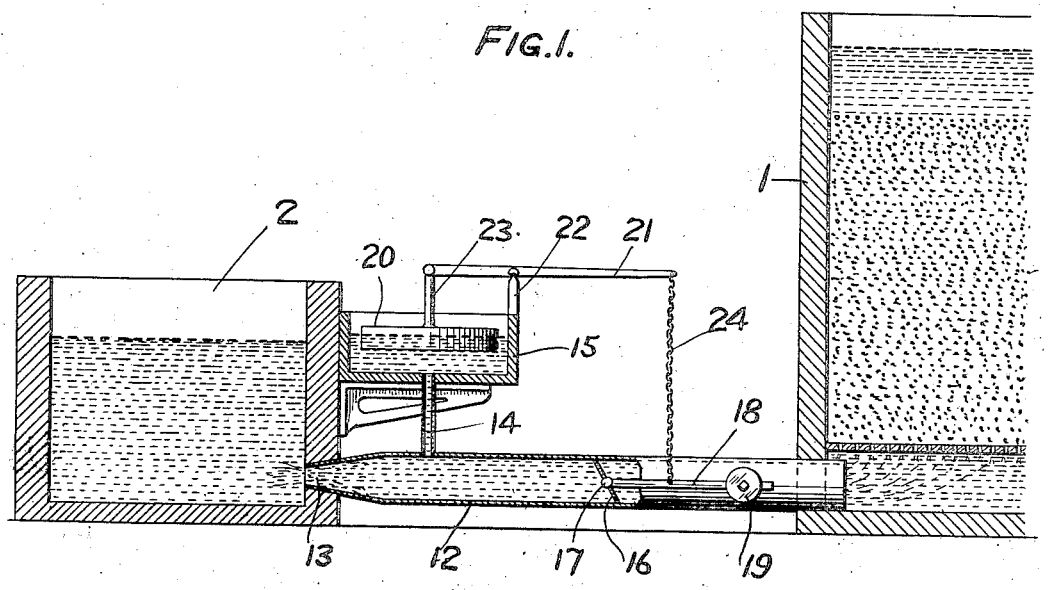

In the accompanying drawings, Figure 1 is a sectional elevation representing a form of the invention, Fig. 2 is a sectional elevation representing a second form of the invention, and Fig. 3 is a sectional elevation representing a third form of the invention.

As shown in Fig. 1, the filter 1 is connected with the effluent chamber 2 by a conduit 3. In the conduit is a valve casing 4 having the contracted outlet 5, the vertical chamber 6, and the ports 7. The ports are controlled by a balanced valve 8 reciprocating in the cage 9, and connected by a stem 10 with a float 11 in the chamber 6. When the head inducing flow through the conduit is at a minimum the float and valve fall and the maximum port opening is attained. As the head rises the water flowing from the filter through the conduit to the effluent chamber, being restrained by the nozzle 5, rises in the float chamber, lifts the float and the valve, and gradually closes the ports, the port opening being reduced as the head rises to maintain a substantially uniform rate of flow regardless of the usual variations in head due to well known conditions in the use of a filter.

As shown in Fig. 2, the filter 1 is connected with the effluent chamber 2 by a conduit 12 having the contracted outlet or nozzle 13. A tube 14 connects the conduit with a chamber 15. A balanced valve 16 is journaled in the conduit upon the axis 17 and has connected therewith a lever 18 on which is an adjustable poise 19. A float 20 in the chamber 15 is connected with the lever 18 through a balancing lever 21 pivoted on the fulcrum 22, the float being connected to the balancing lever by a stem 23 and the balancing lever being connected to the valve lever by a connection such as a chain 24. With the minimum head, the water or other liquid will not rise from the conduit so as to lift the float which is then down and holds the valve at its maximum opening. As the head rises, the liquid flowing in the conduit, being restrained by the nozzle, rises in the float chamber, elevates the float and closes the valve proportionately, so that a regular rate of flow is maintained throughout the variations in head.

As shown in Fig. 3, the filter 1 is connected with the effluent chamber 2 by the conduit 25 having the throat or contracted outlet 26 and containing the valve-casing 27. Within the casing are the ports 28 controlled by the balanced valve 29 which reciprocates in the cage 30. The valve is provided with a stem 31 which is connected with a piston 32 working in the cylinder 33. The lower end of the cylinder is connected with a normal section of the conduit by a passage provided by the tube 34 and the top of the cylinder is connected with the throat of the conduit by a passage provided by the tube 35. With the minimum head, the valve and piston fall to their lower limit and the ports are opened to the maximum. As the head rises the differential pressure communicated to the cylinder through the tubes lifts the piston and valve and gradually closes the ports so that the rate of flow is maintained substantially constant throughout the variations in head.

It will be understood that the construction shown in Fig. 3 is susceptible of modification by stopping the passage through or omitting the tube 35, when the piston or float 32 will rise and fall with variations in pressure or head communicated to the chamber 33 by the single tube 34, the construction shown in this figure carrying forward by additions the principle embodied in Figs. 1 and 2.

Having described my invention, I claim:—

1. The combination of a conduit having a contracted section, a chamber connected with said section so that liquid flowing in said conduit rises in said chamber, a device movable in said chamber by liquid controlled by the head inducing flow in said conduit, a valve for controlling the flow through said conduit, and mechanism connecting said device with said valve so that the position of said device regulates the position of said valve.

2. The combination of a filter, a conduit having a contracted section through which said filter discharges, a chamber, a tube connecting said conduit with said chamber, a device movable in said chamber by liquid from said conduit, a valve for regulating the flow through said conduit, and mechanism whereby said device is connected with and operates said valve.

3. The combination of a conduit having a contracted section, a chamber connected with said conduit, a device in said chamber movable by liquid from said conduit subject to the restraining action of said section, a valve for controlling the flow through said conduit, and mechanism whereby the position of said device regulates the position of said valve.

4. The combination of a conduit having a contracted section, a valve for controlling the flow through said conduit, a reciprocating device connected with said valve, and a chamber containing said device, said chamber having connections on opposite sides of said device with a normal section and the contracted section of said conduit.

5. The combination of a conduit having a contracted section, a valve for controlling the flow through said conduit, a reciprocating device connected with said valve, means for balancing said valve and device, and a chamber containing said device, said chamber having connections on opposite sides of said device with a normal section and the contracted section of said conduit.

6. The combination of a conduit, a chamber connected with said conduit, a tube connecting said conduit and chamber, a movable device in said chamber between its respective connections with said conduit and said tube, and a valve in said conduit and connected with said device so that the position of said device regulates the position of said valve.

In testimony whereof I have hereunto set my name this 6th day of July, 1907, in the presence of the subscribing witnesses.

JOHN W. LEDOUX.

Witnesses:
ROBERT JAMES EARLEY,
JOS. G. DENNY, Jr.